Figure 3:
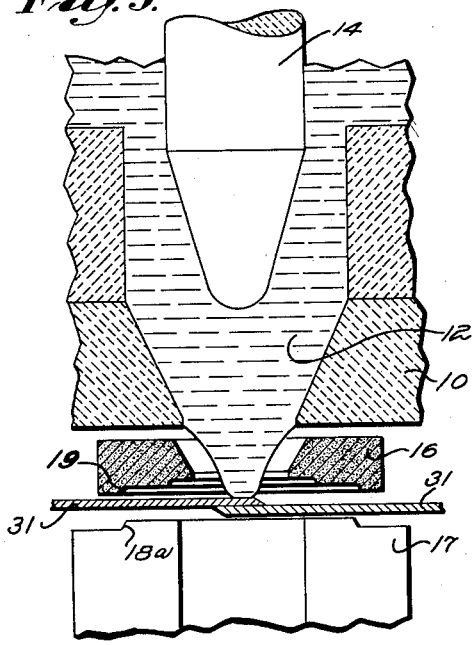

March 21, 1933.                K. E. PEILER                 1,902,788
                    GLASS FEEDING APPARATUS AND METHOD
                    Filed May 2, 1928        2 Sheets-Sheet 1
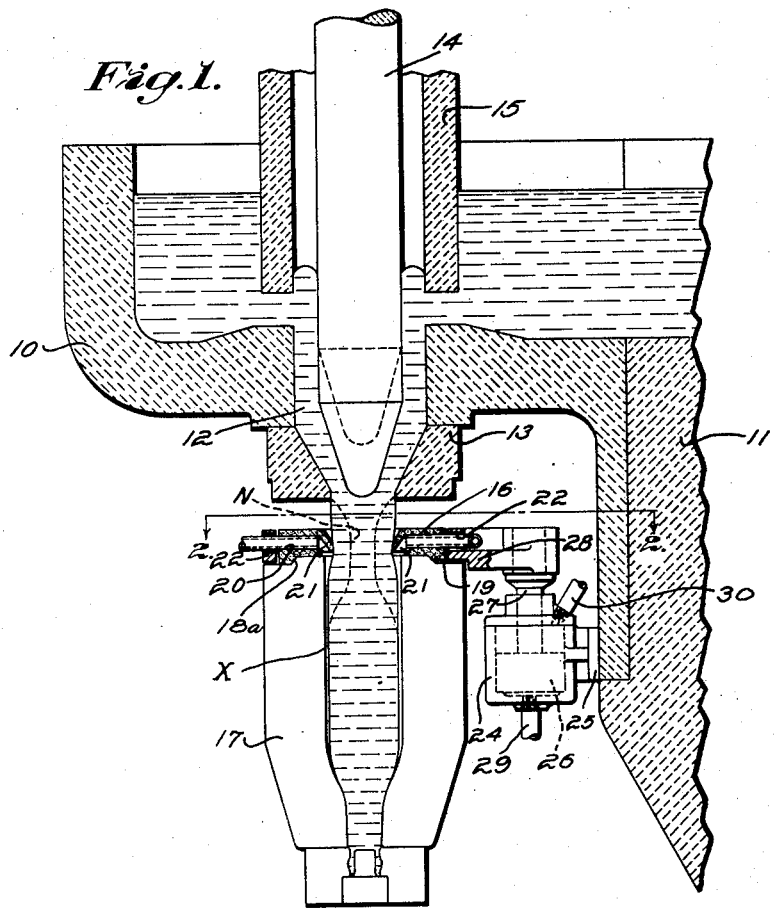
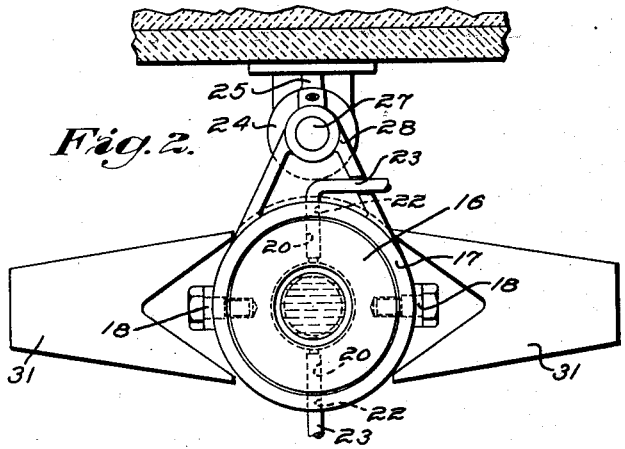
Witness.
Winslow B. Thayer
Inventor:
Karl E Peiler
by Robson D Brown
Attorney March 21, 1933. K. E. PEILER 1,902,788
GLASS FEEDING APPARATUS AND METHOD
Filed May 2, 1928 2 Sheets-Sheet 2

Witness.
Winslow B. Thayer.

Inventor:
Karl E. Peiler
by Robson D. Brown
Attorney

Patented Mar. 21, 1933

1,902,788

UNITED STATES PATENT OFFICE

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE

GLASS FEEDING APPARATUS AND METHOD

Application filed May 2, 1928. Serial No. 274,389.

The present invention relates to the feeding by automatic machinery of mold charges from a source of supply of molten glass to the molds of a glassware shaping machine.

Most automatic glass feeding machines in use at the present time are known in the art as "suspended charge" feeders. Such feeders essentially comprise means for causing a cyclic pulsatory flow of molten glass downwardly past a severing plane to form a mold charge in suspension below the severing plane and periodically operating severing means for severing the mold charges while they hang in suspension, such mold charges then being delivered to the molds of a shaping machine, either directly, as by dropping them into the molds, or indirectly, as by means of suitable chutes or conveyors. An example of a modern suspended charge feeder is disclosed in U. S. Patent 1,655,391, granted to me January 3, 1928. Such feeder includes a vertically reciprocating implement in adhesive contact with the glass above a submerged outlet in the bottom of a glass feeding forehearth for effecting the aforesaid pulsatory downward flow of molten glass from the forehearth. The implement on its upstroke retards, stops or reverses gravity flow of glass from the forehearth through the outlet, and on its downward stroke accelerates gravity flow of glass through the outlet so as to aid in suspending the discharged glass in successive mold charge masses below the outlet and in shaping the suspended mold charge masses so that the mold charges severed therefrom will accurately fit the cavities of the molds for which they are intended. Suspended charge feeders of the type just described have a high efficiency in feeding to the molds of a shaping machine glass mold charges which are of suitable form and condition to be fabricated into practically perfect articles of glassware.

Another type of automatic glass feeding machine has heretofore been suggested, but so far as the applicant is aware, has not gone into commercial use. An example of a glass feeder of the second type may be found in Patent No. 1,196,848, granted September 5, 1916, to E. T. Ferngren. A feeder of this type is adapted to cause a more or less cyclic pulsatory discharge of molten glass from a submerged outlet of a container in a column which enters the open adjacent end of a charge receiver, the cross-sectional area of the column of discharged glass being sufficient to provide a seal at the adjacent end of the receiver and the movement of the column of glass into the charge receiver being facilitated by the production of a vacuum in the charge receiver in advance of the glass. When the charge receiver has been filled, further flow of glass thereto may be decreased and the glass in the charge receiver is separated from the supply body of glass. The charge receiver may be adapted to effect a preliminary shaping of the charge therein.

The present invention combines certain beneficial features of an automatic glass feeder of the suspended charge type and of a feeder of the second named type with novel cooperating beneficial features related to but heretofore not present in a feeder of the second named type so as to provide for the feeding of molten glass into a charge receiver, which may be a mold of a shaping machine, so that a mold charge of shape, size and condition appropriate to the cavity of the charge receiver is supported in the charge receiver before the severance of such mold charge from the supply body of molten glass and such mold charge then is severed from the supply body of glass without causing chill marks or irregularities which would tend to interfere with the fabrication of such charge into a practically perfect article of glassware.

An object of the invention is to provide an improved apparatus for feeding molten glass by a pulsating discharge from a glass delivery outlet through a shearing zone into a charge receiver below and spaced from the outlet so that the discharged glass will be guided into the charge receiver without any smearing or harmful deformation thereof and will assist in producing a seal at the upper end of the charge receiver, the air will be exhausted from the charge receiver when such seal has been produced to facilitate the filling of the glass receiving portion of the charge receiver, the glass entering the charge receiver will move downward therein in the form of a column which, while still connected with glass from the outlet, will have an external contour conforming substantially to the internal contour of the glass receiving portion of the charge receiver and will be supported at the bottom of the latter, and the connecting glass between the glass supported in the charge receiver and the glass at the outlet will be attenuated at the proper time to break the seal at the upper end of the charge receiver and to permit severance of the attenuated glass connection without causing smearing, warping, folding or harmful deformation of the glass at the upper end of the severed mold charge.

A further object of the invention is to provide a glass feeding apparatus of the character described which will be adapted to feed to the molds of a glassware shaping machine glass mold charges which will settle in the cavities of the molds without lapping or folding and so that practically all parts of the surface of each mold charge will move into contact with walls of the cavity of the receiving mold at substantially the same time and will then contact uniformly with such walls, whereby the skin formation on such mold charge will be relatively thin and substantially uniform in thickness.

A still further object of the invention is to provide an improved means for guiding the downwardly moving glass below the discharge outlet into an underlying charge receiver, for cooperating with the descending glass and the charge receiver to produce a seal at the upper end of the latter, and for establishing communication between the space within the charge receiver and a means for exhausting air from such space.

The present invention contemplates the provision of an annular guide below an outlet in the base of a glass feeding forehearth or chamber and in axial alignment with both the outlet and a charge receiver therebeneath, and also in fluid tight contact with the upper end of the charge receiver. The charge receiver may be one of a plurality of molds of a shaping machine which are brought successively to position beneath the guide and the outlet and in which the initial steps of fabricating the severed charges into articles of glassware are performed. The annular guide has an inner diameter at its lower end slightly less or not greater than the inner diameter of the adjacent portion of the glass receiving cavity of the underlying charge receiver and not greater than the diameter of the lower end portion of the column of glass from the outlet of the feeder that is to be guided into the charge receiver. The upper portion of the guide preferably is formed with a flaring internal wall so as to receive the lower end of each downwardly moving column of glass from the feed outlet and to direct such column of glass downwardly through the guide into the charge receiver without tending to rupture the skin which may have formed on the column of glass during its passage from the outlet of the feeder to the guide. The downwardly moving column of glass passing from the outlet of the feeder through the guide into the charge receiver thus will cooperate with the guide to produce a seal at the upper end of the charge receiver and the guide preferably is provided with means in communication with the cavity of the charge receiver to permit the exhaust of air from such cavity as the glass enters, thereby facilitating the filling of the cavity of the charge receiver with the glass, preventing the trapping of air between the charge and the lower part of the cavity of the charge receiver and tending to cause a temporary thin cushion of air between the lateral surface of the glass in the charge receiver and the lateral walls of the cavity of the latter when the descending column of glass reaches the lower end of the charge receiver cavity while air is still being withdrawn from the latter. A substantially instantaneous and uniform contact of the surface of the major portion of the glass charge with the walls of the cavity of the charge receiver will take place as the charge settles slightly therein after the seal has been broken at the upper end of the charge receiver and the glass therein has been severed from the supply body of glass.

The discharge of glass from the feeding forehearth downwardly through the outlet is controlled by a vertically reciprocating implement in adhesive contact with the glass above the outlet. Such implement on its upstroke retards, reverses or stops gravity flow of glass through the outlet and thus causes or permits the connecting glass between the outlet and the glass in the charge receiver to attenuate, forming a connecting neck which will be of less diameter than the inner diameter of any portion of the guide, whereby the seal at the upper end of the charge receiver will be broken. This relatively thin neck can be severed quickly and cleanly by mechanical shears with a minimum of chilling of the upper part of the mold charge and without smearing the upper portion of the mold charge over the upper portion of the charge receiver with consequent irregularities and defects in the glass charge and in the article that is subsequently fabricated therefrom. The guide may be removed from its fluid tight relation with the charge receiver at the time the attenuation of the connecting glass takes place so as to permit severance of the attenuated connecting glass in a plane relatively close to the upper end of the charge receiver or the severance may take place above the plane of the guide.

The attenuation of the glass between the charge and the charge receiver and the supply body of molten glass and the severance of such attenuated glass also may aid in shaping the lower end of the column of glass for the succeeding mold charge so as to more accurately conform to the contour of the lower end of the charge receiver, particularly when the lower end portion of the charge receiver cavity is reduced and is intended for the reception of the portion of the charge that will subsequently form the neck portion of a bottle or like article of narrow-neck glassware.

A practical embodiment of the invention is illustrated in the accompanying drawings, in which Figure 1 is a sectional elevation of a glass feeder embodying the invention, showing in dotted and full lines different steps in the feeding of a mold charge to a charge receiver before severance of the charge;

Fig. 2 is a section substantially along the line 2—2 of Fig. 1, and

Figs. 3 to 6 inclusive, are relatively enlarged fragmentary sectional elevations of the improved feeding apparatus, showing different steps in the formation of the mold charge.

The improved feeding apparatus may comprise a forehearth 10 appurtenant to a glass melting tank 11 and provided in its bottom with a discharge outlet 12 which may be formed partly in the bottom wall of the forehearth and partly in an outlet ring 13 through which the glass issues from the forehearth. The outlet thus has the form of a well into which a vertically reciprocating implement 14 depends and by its reciprocations in adhesive contact with the glass in the forehearth controls the discharge of glass from the outlet. The implement 14 may be surrounded by a refractory tube 15 which preferably is vertically adjustable and serves to regulate the flow of glass into the outlet. The outlet ring 13 preferably is removable so that outlet rings of various sizes may be used at different times to regulate the size and cross-section of the glass column discharging from the outlet. The forehearth may be suitably insulated and provided with burners (not shown) or other means for reheating the glass therein. In construction, the parts described so far may correspond substantially with like parts of the glass feeding apparatus disclosed in Patent No. 1,760,254, granted to me on May 27, 1930.

Figure 4:
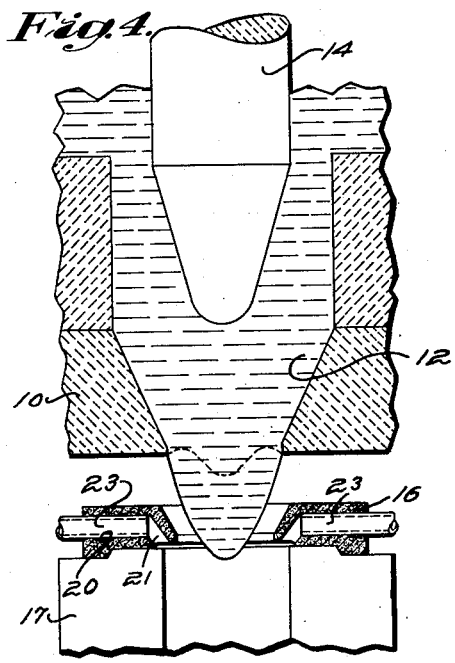
Figure 5:
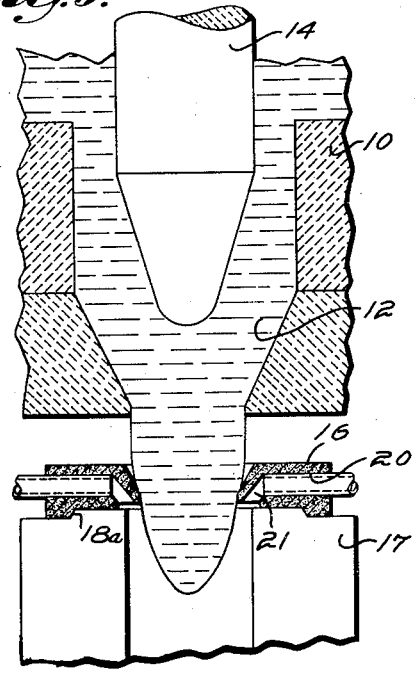
Figure 6:
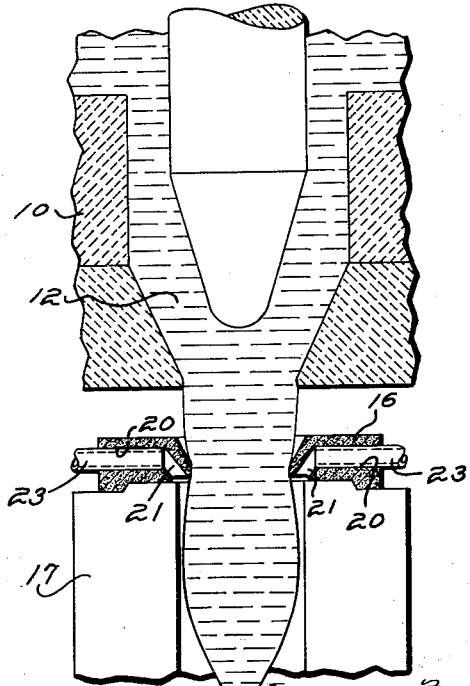

An annular guide 16 may be a one piece ring held removably and for slight floating movement in an annular holder 17 by the set screws 18, as shown in Fig. 2. This annular guide 16 preferably is made of brush carbon or other graphite or graphite composition material which will have but relatively little chilling effect on the glass passing therethrough and to which the molten glass will not stick when the guide is relatively hot. The passage through the guide may enlarge gradually toward its upper edge and the guide thus may be termed a funnel. The diameter of the upper end of the guide passage preferably is greater than the diameter of the lower end of the outlet 12 while the diameter of the lower end of the passage through the guide preferably is approximately the same or slightly less than the diameter of the lower end of the outlet 12 so that the glass discharged from the outlet will move downward in a column, as shown in Fig. 4, and will pass through the guide in fluid tight contact with the lower part of the guide, as shown in Fig. 5. A seal thus will be produced at the upper end of a charge receiver 17 when the charge receiver is in axial alignment with the outlet and the guide is in fluid tight contact with the upper end of the charge receiver, as shown in Fig. 1. The charge receiver may be one of a series of blank molds of an associated glassware shaping machine and such shaping machine will have means for bringing each charge receiver in its turn to a charge receiving position beneath the guide and the outlet. The particular charge receiver shown in Fig. 17 is adapted for use in forming a blank for narrow neck ware, such as bottles, and the cavity of such charge receiver is reduced in cross-section adjacent to its lower end and is provided with a neck ring at its lower end which serves to give the neck portion of the blank a desired shape. The top of the charge receiver may have an annular bevel shoulder 18a with which a complementarily beveled annular shoulder 19 on the bottom of the guide cooperates when the guide rests on the charge receiver so as to assure a fluid tight contact between the guide and the charge receiver, even though the adjacent surfaces thereof should become worn in service.

The guide 16 is provided with radial passages 20 which preferably have downwardly and inwardly turned inner end portions 21 in open comunication with the cavity of the charge receiver when the guide rests on the charge receiver as shown in the drawings. The passages 20 are aligned with radial openings 22 in the guide holder 17. Suitable tubes 23 may have end portions secured in the aligned openings 20—22 and are adapted for connection with any suitable means (not shown) for exhausting air from the space within the cavity of the charge receiver. The guide 16 may be supported for movement to and from position to rest on the charge receiver below the outlet 12, in which event the tubes 23 will be flexible and will have sufficient slack therein to permit the desired movements of the guide.

The means for movably supporting the guide 16 may comprise a vertical cylinder 24 supported by a bracket 25 on an adjacent part of the frame structure for the forehearth or tank furnace. A piston 26 is reciprocable in the cylinder 24 and carries a rod 27 which protrudes from the upper end of the cylinder 24 and carries an arm 28 which carries the guide holder 17. Pressure fluid may be admitted to the lower end of the cylinder 24 through a pipe 29 to raise the piston 26 and to thereby cause upward movement of the guide 16 from the position shown in Fig. 1 to the position shown in Fig. 3. The piston 26 and the parts carried thereby may be permitted to move downward by gravity at the proper time until the guide rests on the upper end of a charge receiver at the charging station, as shown in Fig. 1, or pressure fluid may be admitted to the upper part of the cylinder through a pipe 30 to force piston 26 and parts carried thereby downward positively until the guide 16 is in fluid tight contact with the upper end of the charge receiver. Any suitable means, not shown, may be provided for alternately admitting and exhausting pressure fluid from the opposite ends of the cylinder 24 to effect the desired movements of the guide 16 at the proper times in a cycle of operations of the feeding apparatus.

A pair of shear blades 31 (see Figs. 2 and 3) are provided for periodically severing the connecting glass between the charge in the charge receiver 17 and the glass at the outlet. These shear blades and their operating mechanism may be substantially as disclosed in my aforesaid copending application Serial No. 683,576. In the particular embodiment of the invention illustrated in the drawings, the shear blades 31 are adapted to be closed in a plane close to the upper end of the charge receiver and below the guide when the guide is in its raised position, as shown in Fig. 3. The raising of the guide from the position shown in Fig. 1 to the position shown in Fig. 3 and the closing of the shear blades to sever the connecting glass between the charge receiver and the outlet therefore are suitably timed so as to permit the severance of the glass and the opening of the shear blades while the guide is in its raised position. It is obvious, however, that the shear blades may be supported for operation in a plane close to the upper surface of the guide so that the guide need not be raised or moved out of contact with the charge receiver during the severance of the mold charge in the charge receiver from the supply body of glass. It will also be obvious that both the guide and its holder may be made of cooperative sections instead of each being formed in a single piece as shown, and that such sections may be opened and moved periodically by any suitable known means, either to provide space for the severance of the glass above the charge receiver at the proper time or for any other useful purpose. Also, the guide may be given various movements and comprise various structural features other than those illustrated in the drawings and specifically described above without departing from the spirit and scope of the invention.

The operation of the improved apparatus during the formation and deposit of a mold charge in the charge receiver is substantially as follows:—

The charge receiver having been brought to a position beneath the outlet and in substantially axial alignment with the outlet, as shown in the drawings, the guide 16 is lowered from a raised position, as shown in Fig. 3, to position on the upper end of the charge receiver, as shown in the remaining figures. Glass will issue from the outlet in a column, as shown in Fig. 4, and such column of glass will move downward through the guide 16 into the charge receiver past the successive positions shown in Figs. 5 and 6 until the lower end portion of the glass column completely fills the lower portion of the charge receiver as shown in Fig. 1. During this downward movement of the glass column, the implement 14 has moved downward and has accelerated gravity flow of glass through the outlet so that attenuation of the downwardly moving column of discharged glass has been prevented and such column therefore is substantially cylindrical, as shown by the full lines in Fig. 1. This downwardly moving column of glass has been guided into the cavity of the charge receiver centrally of the latter by the guide 16 and cooperates with the latter to produce an air tight seal at the upper end of the charge receiver. Exhaust of air from the cavity of the charge receiver through the passages 21 and the tubes 23 will facilitate the downward movement of the glass in the charge receiver from the position shown in Fig. 5 to the position shown in Fig. 1 and will tend to cause the glass therein to swell out so as to conform substantially to the contour of the cavity of the charge receiver. Since the exhaust of air from the cavity takes place through passages at the top of the charge receiver and radially outward from the guide passage through which the glass enters the charge receiver, the time of creation of such vacuum in the charge receiver may be selected with relation to the time of descent of the glass therein, so that the major portion of the glass charge in the charge receiver will be spaced slightly from walls of the charge receiver by a thin cushion of air, indicated at X in Fig. 1. The return or upward stroke of the implement will reverse, retard or stop the movement of glass in the outlet so that the connecting glass between the outlet and the charge in the charge receiver will be attenuated, thus producing a neck substantially as indicated by the dotted lines at N in Fig. 1. This neck is of less diameter than the smallest part of the passage through the guide 16 and consequently the guide 16 may be raised from the position shown in Fig. 1 to the position shown in Fig. 3 without contact with such neck. The shear blades then are closed, as indicated in Fig. 3, to sever the neck close to the mold charge. The skin formation on the mold charge will be relatively thin and uniform for practically the entire mold charge. This permits such mold charge to be fabricated into a practically perfect article of hollow glassware. It is to be noted particularly that the guide 16 will direct the column of glass from the outlet into the cavity of the charge receiver without tending to cause smearing of the glass at the upper end of the charge receiver and that the attenuation of the connecting glass between the charge and the glass at the outlet permits severance of the mold charge from its source of supply without smearing glass at the upper end of such charge onto the walls of the charge receiver or causing defects in or unequal chilling of the upper end of such charge as are likely to be caused when the severance of the glass in a charge receiver is to be effected by a sliding shear blade cooperating either with the upper edge of the charge receiver or its support or with the outlet from which glass is supplied to the charge receiver. The guide being made of graphite or graphite composition, such as brush carbon, can be used while relatively hot without the glass sticking thereto and consequently the chilling of the glass passing through the guide into the cavity of the charge receiver is minimized.

The glass stub left after the severance of the neck may be retracted upward from the position shown in Fig. 3 to the position shown by the dotted lines in Fig. 4 by reason of the upward movement of the implement, thereby reheating such stub to remove any chill marks caused by the contact of the shear blades therewith. As soon as the upstroke of the implement has ended, the glass stub, augmented by glass from the outlet, moves downward as indicated by the full lines in Fig. 4 and a new cycle of operations of the apparatus is initiated.

While a preferred embodiment of the invention has been illustrated in the accompanying drawings and described herein, it is to be understood that the various features of the invention may be modified in structure, combination and arrangement to adapt the invention to different uses or different conditions of service, without departing from the spirit and scope of the invention as indicated in the appended claims.

I claim:

1. Glass feeding apparatus comprising a container having a downwardly opening discharge outlet, a charge receiver below and spaced from said outlet, and an annular guide between said charge receiver and said container for directing glass discharged from the outlet into said charge receiver, said guide being adapted to cooperate with the glass passing therethrough and with said charge receiver to produce a seal at the upper end of the charge receiver, said guide having a passage for the exhaust of air from the interior of the charge receiver while glass is passing through the guide into said charge receiver.

2. Glass feeding apparatus comprising a container for molten glass having a downwardly opening discharge outlet, a charge receiver below and spaced from said outlet, an annular guide movable to and from position to rest on said charge receiver in substantially axial alignment with the charge receiver and the outlet, said annular guide having an inner diameter at its lower end approximately the same as the diameter of the lower end of said outlet and less than the inner diameter of the adjacent portion of the charge receiver, the inner diameter of said guide increasing gradually from its lower end to its upper end, means controlling the discharge of glass through said outlet to prevent substantial attenuation of the glass passing through said guide into the charge receiver until the lower end of such glass reaches a supporting surface within the charge receiver and for then attenuating the glass passing through said guide, means for raising said guide out of contact with said charge receiver while said glass is attenuated, and a pair of shear blades arranged to meet in a plane between said raised guide and the charge receiver to sever the attenuated glass.

3. The method of feeding molten glass from a downwardly opening outlet to a charge receiver below and spaced from the outlet, comprising the steps of discharging glass downwardly from the outlet in a column having an area in cross section not substantially less than the cross-sectional area of the major portion of the cavity of the charge receiver, guiding the lower end of said column into the cavity of said charge receiver centrally of the latter and augmenting the column of glass by discharge of glass from said outlet at a rate so related to the rate of downward movement of the lower end of said column in the cavity of said charge receiver as to prevent substantial attenuation of any portion of said column before the lower end thereof reaches the lower end of the cavity of the charge receiver, attenuating the glass column at the upper end of the charge receiver, and severing the attenuated glass column at a plane close to that of the upper end of said charge receiver.

4. The method of feeding molten glass from a downwardly opening outlet to a charge receiver below and spaced from the outlet, comprising the steps of discharging glass downwardly from the outlet in a column having an area in cross section not substantially less than the cross-sectional area of the major portion of the cavity of the charge receiver, guiding the lower end of said column into the cavity of said charge receiver centrally of the latter and providing a seal between the glass column and the upper end of the charge receiver, augmenting the column of glass by discharge of glass from said outlet at a rate so related to the rate of downward movement of the lower end of said column in the cavity of said charge receiver as to prevent substantial attenuation of any portion of said column before the lower end thereof reaches the lower end of the cavity of the charge receiver, breaking the seal between the glass and the upper end of the charge receiver and attenuating the glass column at the upper end of the charge receiver, and severing the attenuated glass at a plane close to that of the upper end of said charge receiver.

5. The method of feeding molten glass from a downwardly opening outlet to a charge receiver below and spaced from the outlet, comprising the steps of discharging glass downwardly from the outlet in a column having an area in cross section not substantially less than the cross-sectional area of the major portion of the cavity of the charge receiver, guiding the lower end of said column into the cavity of said charge receiver centrally of the latter and providing a seal between the glass column and the upper end of the charge receiver, augmenting the column of glass by discharge of glass from said outlet at a rate so related to the rate of downward movement of the lower end of said column in the cavity of said charge receiver as to prevent substantial attenuation of any portion of said column before the lower end thereof reaches the lower end of the cavity of the charge receiver, applying sub-atmospheric pressure to the cavity of the charge receiver around the glass at the upper end of the latter to aid in effecting contact of the lateral surface of the glass in the charge receiver with the side walls of said cavity, breaking the seal between the glass column and the upper end of the charge receiver and attenuating the glass column at the upper end of said charge receiver, and severing the attenuated glass at a plane close to that of the upper end of said charge receiver.

Signed at Hartford, Conn., this 21st day of April, 1928.

KARL E. PEILER.